Patented Dec. 5, 1933

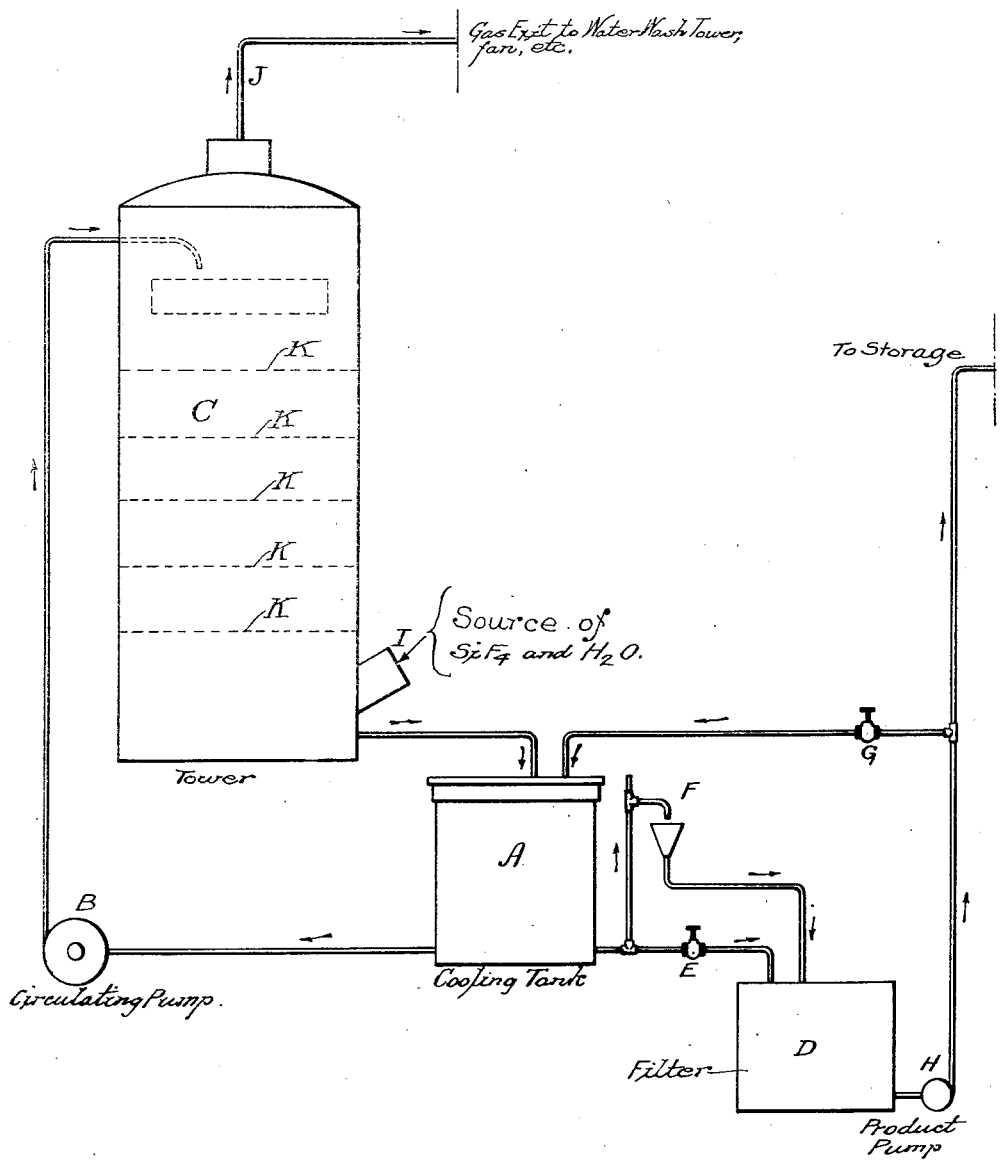

1,938,533

UNITED STATES PATENT OFFICE 1,938,533

PROCESS OF MANUFACTURING HYDRO-FLUOSILICIC ACID

Walker Penfield, Ridley Park, Pa., assignor to Pennsylvania Salt Manufacturing Company, Philadelphia, Pa., a corporation of Pennsylvania Application February 17, 1931. Serial No. 516,456

7 Claims. (Cl. 23—153)

My invention relates to the manufacture of hydrofluosilicic acid, and more particularly it relates to a process for the manufacture of this acid from fertilizer den gases, or other similar sources containing the necessary ingredients.

One object of my invention is to provide a process for the manufacture of hydrofluosilicic acid by which it is possible to obtain the acid in a concentration higher than that normally obtained when similar sources of chemicals are used.

A further object is to provide a process for the manufacture of solutions containing relatively high proportions of hydrofluosilicic acid from gas streams containing the necessary ingredients for the manufacture of the acid, which process is characterized by simplicity of operation and dependability of results.

Other objects will be apparent from a consideration of the specification and claims.

In the attaching drawing, I have shown diagrammatically one type of apparatus which may be used in carrying out the process of the present invention. My invention is capable of being accomplished in various types of apparatus, and the accompanying drawing is merely illustrative.

In the manufacture of certain chemicals, particularly phosphate fertilizers, a gas is evolved which is utilized in the manufacture of hydrofluosilicic acid. This gas as it issues from the fertilizer dens contains among other ingredients, silicon tetrafluoride ($SiF_4$) and water vapor. Heretofore the gas has been brought into contact with water, or dilute hydrofluosilicic acid, and the silicon tetrafluoride has been thus transformed by the water into hydrated silica, or orthosilicic acid and hydrofluosilicic acid in accordance with the following equation:

$$3SiF_4 + 4H_2O \rightarrow 2H_2SiF_6 + Si(OH)_4$$

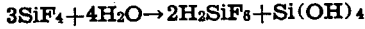

The strength of the hydrofluosilicic acid thus obtained is very low, due to the water which has been added, the concentration averaging in most cases from 6 percent to 10 percent.

In accordance with the present invention, it is possible to obtain a concentrated solution of hydrofluosilicic acid directly from the gaseous source of raw material. Solutions of this high concentration are of use in the trade; even when solutions of less strength are to be used by the consumer, large savings are made in the handling and shipping costs, since the concentrated material may be shipped and then diluted if so desired by the user.

The process of my invention contemplates the cooling and condensing under predetermined and controlled conditions of a gas stream containing silicon tetrafluoride and water vapor, and without the use of any water or water vapor in addition to that contained in the gas stream. I have found that the strength of the resulting hydrofluosilicic acid is dependent upon: (under given pressure conditions)

1. The amount of silicon tetrafluoride in the gases
2. The amount of water vapor present in the gas; and
3. The temperature to which the gases are cooled.

It will thus be seen that for a gas containing definite amounts of silicon tetrafluoride and water vapor, the strength of the resulting solution is dependent upon the temperature to which the gases are cooled under given pressure conditions.

Various methods may be used by which this cooling and condensation may be effected, but due to the difficulties encountered due to the precipiation of the hydrated silica which is formed simultaneously with the hydrofluosilicic acid in accordance with the above equation, it has been found preferable to cool and condense the gases in a tower equipped with perforated plates through which a relatively large quantity of strong hydrofluosilicic acid of approximately the same strength as that desired in the finished acid is passed. This acid is passed through the tower at the desired temperature, and is maintained at this temperature by cooling before or during circulation. By this means, the heat is removed from the gases and an acid containing 20 per cent. to 30 per cent. of hydrofluosilicic acid may be obtained, even when there is present a large amount of air or other gases. When conditions are such that there is a relatively small amount, or an absence of inert gases, an acid may be obtained of strength limited only by the relative $SiF_4$ and $H_2O$ contents of the gas stream, and the temperature and pressure conditions under which the acid is condensed.

An example of a layout for carrying out the invention is illustrated in the accompanying drawing. The system is filled with a hydrofluosilicic acid solution of the strength desired in the finished acid, made either from the previous runs in accordance with this invention, or obtained by reacting sand and hydrofluoric acid. Referring to the drawing, the cooling tank A is provided with cooling coils, or their equivalent made of suitable acid-resistant material.

This tank acts as a supply tank for the pump B, which lifts the cooled acid to the top of the tower C, which is provided with suitable perforated plates K. The acid falls downwards through the plates K of the tower C, meeting the gas which enters the tower at inlet I, and passes upwards, leaving the tower at outlet J. In the tower the gas which enters at a relatively high temperature comes in intimate contact with the shower of cool acid solution, and is cooled to the desired exit temperature. In this manner, most of the hydrofluosilicic acid formed is removed from the gases, and becomes part of the acid stream. It is desirable to maintain a large volume of acid in circulation, since better removal of the hydrofluosilicic acid is thus afforded, due to more effective scrubbing of the gases at a more nearly uniform temperature, and since the large supply of acid removes the hydrated silica from the perforated plates K, thus avoiding clogging of the perforations. This is a very important feature from a practical standpoint.

The increase in quantity of acid resulting from the removal of the hydrofluosilicic acid and water vapor from the gas causes acid to run from the standpipe F into the filter D. After passing through the filter to remove the hydrated silica, the acid solution is pumped to storage by pump H. In starting the operation, the system may be filled with the acid from the storage tank through the pipe line and valve G. While the tower C in the drawing shows an operation on the counter-flow principle, the gas, if desired, may be admitted at the top and withdrawn from the bottom of the tower in a co-flow system.

It has been found beneficial to the operation of the unit, at times, to draw off acid from the bottom of the cooling tank A through the valve E to the filter D, and after filtration, to return the clear acid to the cooling tank A. This aids in keeping the system free from accumulation of hydrated silica, which tends to clog the perforated plates, pumps, cooler, etc.

In a typical case where a finished acid of 25 per cent concentration is desired, the system is operated with 350 gallons per minute of circulating acid of this strength, at a temperature of approximately 120 degrees F. The inflowing gas enters at a temperature in the neighborhood of 175 degrees F, and contains 780 pounds of silicon tetrafluoride ($SiF_4$) and 2,519 pounds of water vapor passing through the system in 45 minutes. The rate of flow of gas and of circulation of acid in the system maintained at 120 degrees F. is such that the gases leave the tower at approximately this temperature. The acid obtained under these conditions has a concentration of 25 per cent $H_2SiF_6$. Theoretically, assuming that all the silicon tetrafluoride is converted to hydrofluosilicic acid and hydrated silica when the temperature of the gas is reduced, 180 pounds of water would be used in the reaction, and 722 pounds of hydrofluosilicic acid would be formed in accordance with the equation hereinbefore given. There would, therefore, be present 722 pounds of hydrofluosilicic acid and 2,339 pounds of water; and if both were completely condensed, the resulting acid would be of 23.6 per cent strength. Since, however, the exit gases were at 120 degrees F., some of the water vapor and a slight amount of the hydrofluosilicic acid were contained in the exit gases, and a 25 per cent acid solution was obtained. Careful regulation of the temperature and circulation of the acid results in a high recovery of the available hydrofluosilicic acid.

Since in the operation of the process, the loss of water vapor is considerably greater than the loss of acid, it is possible by controlling the temperature of the acid in the tower, and in turn, the exit temperature of the gases, to obtain the concentration desired (within limits), and thus to use the temperature of the circulating acid as a convenient control of the acid strength. The use of a temperature higher than 120 degrees F., for example, 130 degrees F., results in a higher acid concentration, but with greater loss in hydrofluosilicic acid. If necessary or desirable, the gases leaving the tower may be passed through the usual water spray for removing the small amount of hydrofluosilicic acid contained therein, thus giving them a final cleaning prior to discharge into the atmosphere. The weak hydrofluosilicic acid obtained may be sold as a by-product of the present process.

In the foregoing example, the application of this process to the recovery of hydrofluosilicic acid from fertilizer den gases has been described. It is to be understood, however, that the recovery of hydrofluosilicic acid from gases of other sources is within the scope of this invention. The amounts of silicon tetrafluoride and water present will vary with the gases encountered. In some cases, as in the previous example, there may be present a large amount of inert gases; while in other cases the $SiF_4$ and $H_2O$ may be either the entire constituents of the gas stream or may represent the major portion thereof. Naturally, the concentration of the acid will vary with the proportions of these ingredients. It will vary also with the amount of inert gas, due to its effect on the vapor pressure. It will further vary in accordance with the pressure under which the operation is conducted. In the foregoing example, the process described contemplates the use of atmospheric pressure. In some instances, the use of pressures higher than one atmosphere may be found advantageous. By the use of these higher pressures, it is possible to modify the concentration of hydrofluosilicic acid obtained from a gas stream containing given amounts of $SiF_4$ and $H_2O$. Obviously, if the pressure conditions are changed, the temperature conditions necessary to obtain a given concentration of acid will have to be varied accordingly.

It will be noted that in the process of the present invention, the gas stream itself is utilized to furnish all of the necessary ingredients in the production of the hydrofluosilicic acid. In other words, the acid is formed without the addition of extra water, the water necessary for the formation and recovery of the acid having been obtained by condensation of water vapor already in the gases as they issue from the apparatus of their source, for example, from the fertilizer den. In the process the gases are cooled to a predetermined temperature corresponding to the concentration desired, at which temperature the hydrofluosilicic acid resulting from the reaction and a portion of the water vapor are condensed.

While the use of fertilizer den gases has been given in the specific example, other gases containing silicon tetrafluoride and water vapor may be used in the formation of the strong hydrofluosilicic acid solution. Obviously, also the amount of these ingredients in the gas stream and the temperature and concentrations

I claim:

1. The step in the process of manufacturing hydrofluosilicic acid solutions of a concentration between twenty per cent. and thirty per cent. from a gas containing silicon tetrafluoride and water vapor, which comprises cooling the gas to a temperature at which the formation and condensation of hydrofluosilicic acid takes place by intimately contacting it without the introduction of additional water with a solution of hydrofluosilicic acid of a concentration between twenty per cent. and thirty per cent. maintained at said temperature, thus obtaining the water necessary for the reaction and preparation of the concentrated acid from the gas.

2. The step in the process of manufacturing hydrofluosilicic acid solutions of a concentration between twenty per cent. and thirty per cent. from a gas containing silicon tetrafluoride and water vapor, which comprises cooling the gas to a temperature in the neighborhood of 120° F. by intimately contacting it without the introduction of additional water with a solution of hydrofluosilicic acid of a concentration between twenty per cent. and thirty per cent. maintained at said temperature, thus obtaining the water necessary for the reaction and preparation of the concentrated acid from the gas.

3. The step in the process of manufacturing a hydrofluosilicic acid solution of twenty-five per cent. strength from a gas containing silicon tetrafluoride and water vapor which comprises cooling the gas to a temperature of approximately 120° F. by bringing it without the introduction of additional water into intimate contact with a solution of hydrofluosilicic acid of an approximate concentration of twenty-five percent. maintained at said temperature, thus obtaining the water necessary for the reaction and preparation of the concentrated acid from the gas.

4. The process of manufacturing hydrofluosilicic acid solutions of a concentration between twenty per cent. and thirty per cent. from a gas containing silicon tetrafluoride and water vapor which comprises circulating in a system a solution of hydrofluosilic acid of a concentration between twenty per cent. and thirty per cent., the concentration employed within said range corresponding approximately to the concentration of acid to be produced, maintained at a temperature corresponding to that at which the relative amounts of hydrofluosilicic acid and water condensed from the gas stream will produce an acid of said concentration, and bringing the gas without the introduction of additional water into intimate contact with said circulating solution to cool it to the temperature thereof, thus obtaining the water necessary for the reaction and preparation of the concentrated acid from the gas.

5. The process of manufacturing hydrofluosilicic acid solutions of a concentration between twenty per cent. and thirty per cent. from a gas containing silicon tetrafluoride and water vapor which comprises circulating in a system a solution of hydrofluosilicic acid of a concentration between twenty per cent. and thirty per cent., the concentration employed within said range corresponding approximately to the concentration of acid to be produced, maintained at a temperature in the neighborhood of 120° F., and bringing the gas without the introduction of additional water into intimate contact with said circulating solution to cool it to the temperature thereof, thus obtaining the water necessary for the reaction and preparation of the concentrated acid from the gas.

6. The process of manufacturing hydrofluosilicic acid solutions of a concentration between twenty per cent. and thirty per cent. from a gas containing silicon tetrafluoride and water vapor which comprises circulating in a system a volume of solution of hydrofluosilicic acid sufficient in amount to reduce to a minimum clogging of the system by hydrated silica resulting from the reaction and of a concentration between twenty per cent. and thirty per cent., the concentration employed within said range corresponding approximately to the concentration of acid to be produced, maintained at a temperature corresponding to that at which the relative amounts of hydrofluosilicic acid and water condensed from the gas stream will produce an acid of said concentration, and bringing the gas without the introduction of additional water into intimate contact with said circulating solution to cool it to the temperature thereof, thus obtaining the water necessary for the reaction and preparation of the concentrated acid from the gas.

7. The process of manufacturing hydrofluosilicic acid solutions of a concentration between twenty per cent. and thirty per cent. from a gas containing silicon tetrafluoride and water vapor which comprises circulating in a system a volume of solution of hydrofluosilicic acid sufficient in amount to reduce to a minimum clogging of the system by hydrated silica resulting from the reaction and of a concentration between twenty per cent. and thirty per cent., the concentration employed within said range corresponding approximately to the concentration of acid to be produced, maintained at a temperature in the neighborhood of 120° F., and bringing the gas without the introduction of additional water into intimate contact with said circulating solution to cool it to the temperaure thereof, thus obtaining the water necessary for the reaction and preparation of the concentrated acid from the gas.

WALKER PENFIELD.